United States Patent
Teusch et al.

(10) Patent No.: US 9,566,650 B2
(45) Date of Patent: Feb. 14, 2017

(54) HYDRO-EXPANSION CHUCK

(71) Applicant: GUEHRING OHG, Albstadt (DE)

(72) Inventors: Bruno Teusch, Esslingen (DE); Hakki Aygün, Krauchenwies (DE)

(73) Assignee: Guehring OHG, Albstadt (DE)

( * ) Notice: Subject to any disclaimer, the term of this patent is extended or adjusted under 35 U.S.C. 154(b) by 493 days.

(21) Appl. No.: 13/859,140

(22) Filed: Apr. 9, 2013

(65) Prior Publication Data

US 2013/0292913 A1   Nov. 7, 2013

(30) Foreign Application Priority Data

Apr. 13, 2012  (DE) .................. 10 2012 206 069
Aug. 23, 2012  (DE) .................. 10 2012 215 036

(51) Int. Cl.
*B23B 31/30* (2006.01)
*B23B 31/117* (2006.01)
*B23B 31/20* (2006.01)

(52) U.S. Cl.
CPC ........... *B23B 31/30* (2013.01); *B23B 31/1178* (2013.01); *B23B 31/204* (2013.01); *B23B 31/305* (2013.01); *B23B 2231/04* (2013.01); *B23B 2231/54* (2013.01); *B23B 2260/026* (2013.01); *Y10T 279/1021* (2015.01); *Y10T 279/1249* (2015.01)

(58) Field of Classification Search
CPC .. B23B 31/1178; B23B 31/204; B23B 31/305; B23B 2231/04; B23B 2231/54; B23B 2260/026; B23B 31/083; Y10T 279/1021; Y10T 279/17

USPC ................. 279/4.01, 4.03, 4.06, 4.07, 4.11
See application file for complete search history.

(56) References Cited

U.S. PATENT DOCUMENTS

| 3,726,532 A | * | 4/1973 | Zeilinger .................. 279/52 |
| 4,387,906 A | * | 6/1983 | Nicolin ..................... 279/2.07 |
| 5,067,861 A | * | 11/1991 | Danielsen ................. 279/4.03 |
| 5,383,673 A | * | 1/1995 | Mogilnicki ............... 279/46.4 |
| 5,636,851 A | * | 6/1997 | Kanaan ..................... 279/46.7 |
| 5,964,556 A | * | 10/1999 | Toyomoto ................. 409/234 |
| 2003/0047889 A1 | * | 3/2003 | Gerber ....................... 279/49 |
| 2006/0251483 A1 | * | 11/2006 | Song ....................... 408/239 R |
| 2012/0321401 A1 | * | 12/2012 | Johnson et al. ............ 408/18 |
| 2013/0001896 A1 | * | 1/2013 | Herud ..................... 279/4.07 |
| 2013/0119618 A1 | * | 5/2013 | Pfister ..................... 279/4.03 |

FOREIGN PATENT DOCUMENTS

| DE | 202011004231 U1 | * | 8/2011 | ........... B23B 31/201 |
| EP | 1839786 A1 | * | 10/2007 | |
| EP | 2106869 A1 | * | 10/2009 | |

* cited by examiner

*Primary Examiner* — Eric A Gates
*Assistant Examiner* — Paul M Janeski
(74) *Attorney, Agent, or Firm* — Burr & Brown, PLLC

(57) ABSTRACT

The invention relates to a hydraulic expansion chuck (1) with a hydraulic expansion mechanism (23) that is integrated into a chuck body (10, 20) and exhibits an expansion bushing (23*a*) with a continuous cylindrical interior wall, and to a reducing bushing (24) arranged in the expansion bushing (23*a*) for accommodating a shank tool (W), in particular a tap drill. According to the invention, the outer circumference of the reducing bushing (24) is positively connected with the chuck body (10, 20) in a torque-proof manner, and its inner circumference is designed to be positively connected with the shank tool (W) in a torque-proof manner.

14 Claims, 5 Drawing Sheets

HYDRO-EXPANSION CHUCK

The invention relates to a hydraulic expansion chuck with a hydraulic expansion mechanism that is integrated into a chuck body and exhibits an expansion bushing with a continuous cylindrical interior wall, and to a reducing bushing arranged in the expansion bushing for accommodating a shank tool, in particular a tap drill.

Such hydraulic expansion chucks are known from WO 2012/013629 A1 or the 2009 product catalogue of the applicant, for example. In order to be able to reliably transfer high torques of up to 50 Nm to the shank tool with such a hydraulic expansion chuck, a continuously round shank without lateral flatted areas having a diameter tolerance in the h6 range is usually recommended. By contrast, a lower diameter tolerance can significantly reduce the torque transmission capacity. It was discovered that a torque of up to 15 Nm can now be transmitted at a diameter tolerance in the h9 range with a conventional hydraulic expansion chuck.

In addition, it is recommended that a reducing bushing be used in particular for shanks with a lateral flattened area, e.g., according to DIN 6535 Form HB or HE, and for bridging a diameter difference between the (larger) inner diameter of the expansion bushing and the (smaller) outer diameter of the shank of a shank tool to be clamped into the hydraulic expansion chuck. An axially central length section of a conventional reducing bushing exhibits a plurality of longitudinal slots equidistantly distributed around the circumference of the reducing bushing, which make it possible to uniformly distribute the expansion force in a circumferential direction from the expansion bushing of the hydraulic expansion mechanism to the shank tool accommodated in the expansion bushing. The longitudinal slots are concentrated on an axially central length section. Such a reducing bushing can increase the permissibly transferable torque by comparison to direct clamping, provided a shank tolerance of h6 is maintained.

However, a diameter tolerance in the h6 range is not common for tap drill shanks. The shanks of tap drills are usually fabricated with a diameter tolerance in the h9 range. Therefore, a clearly diminished torque transmission capacity results for these kinds of tap drills during use with a conventional hydraulic expansion chuck. For example, the torque transmission capacity could basically be increased by having the shank of the tap drill exhibit a lateral entraining surface, e.g., according to the aforementioned DIN 6535 Form HB or HE, and by modifying the hydraulic expansion chuck, e.g., guided by the instruction described in the aforementioned WO 2012/013629 A1. This publication proposes a torque-proof arrangement for a shank tool clamped in a hydraulic expansion chuck, in which an entrainer screw that is held in the base body of a hydraulic expansion chuck in a radially adjustable manner and guided through a radial opening in the expansion bushing is positively engaged with a lateral entraining surface on the shank of the shank tool. However, such a modification is associated with a considerable structural and financial outlay, and entails both a weakening of the base body due to the threaded hole in the base body, and a non-uniform clamping of the shank tool due to the radial opening in the expansion bushing.

Therefore, the object of the invention is to further develop a conventional hydraulic expansion chuck with a hydraulic expansion mechanism that is integrated in a chuck body and exhibits an expansion bushing with a continuous cylindrical interior wall without a radial opening in a cost effective and structurally simple manner, so as to produce a reliable clamping between a shank tool, in particular a tap drill, and a shank fabricated with a larger diameter tolerance, i.e., h9, for example, which has a quality corresponding to a significantly tighter diameter tolerance, e.g., h6, and enables the transmission of a higher torque. This object is achieved by a hydraulic expansion chuck according to claim 1. Advantageous further developments are the subject of dependent claims.

A hydraulic expansion chuck according to the invention exhibits a hydraulic expansion mechanism, which is integrated in a chuck body, and has an expansion bushing along with a reducing bushing arranged in the expansion bushing for accommodating a shank tool, in particular a tap drill.

The primary area of application for the hydraulic expansion chuck according to the invention involves thread generation, in particular via tapping or thread molding. In particular, a hydraulic expansion chuck according to the invention is thus designed in such a way as to enable an axial compressive/tensile force length compensation, and advantageously also a torque compensation, in order to compensate for synchronization errors between the spindle feed and pitch of the thread to be fabricated, as is usually the case for screwing chucks. In a preferred embodiment, the chuck body can be divided into a base body and a receptacle joined with the base body at least in an axially elastic, preferably in a torsionally and axially elastic, manner, wherein the hydraulic expansion mechanism with the reducing bushing accommodated in the expansion bushing is integrated into the receptacle. However, the hydraulic expansion chuck according to the invention is not limited to use for thread generation, but rather is universally suitable for various shank tools, e.g., drills, milling cutters, etc.

According to the invention, the outer circumference of the reducing bushing is positively connected with the chuck body in a torque-proof manner, either directly or indirectly by means of the expansion bushing immovably fixed in the chuck body, while its inner circumference is designed to be positively connected with the shank tool in a torque-proof manner. The resultant twofold positive fit achieved for the reducing bushing—with the chuck body of the hydraulic expansion chuck on the one hand and with the shank of a shank tool to be clamped in the hydraulic expansion chuck on the other-yields a reliable, torque-proof accommodation of the shank tool in the hydraulic expansion chuck that basically does not depend on the tolerance for the shank diameter of the shank tool. By comparison to conventional hydraulic expansion chucks, the solution according to the invention hence enables the transmission of higher torques without any additional torque entrainers for a larger tolerance field, e.g., h9, with respect to the shank diameter of the shank tool to be clamped, which could previously only be accomplished with significantly tighter tolerances, e.g., h6. In addition, the solution according to the invention makes it possible to clamp various shank diameters into one and the same hydraulic expansion chuck due to the reducing bushing.

Conventional hydraulic expansion chucks can be modified relatively easily by replacing or reconfiguring the expansion bushing in such a way as to obtain the twofold positive fit mentioned above between the expansion bushing and reducing bushing, or between the reducing bushing and shank tool.

Because of the positive fit between the reducing bushing and chuck body on the outer circumference, the hydraulic expansion chuck according to the invention also offers the option to centrally supply coolant/lubricant along the rotational axis of a feed site on the machine tool spindle side, through the hydraulic expansion chuck and to a clamped shank tool. For example, a known MQL (minimum quantity lubrication) transfer system can be used for this purpose.

Therefore, the invention makes it possible to modify, in a structurally easily manageable, and hence cost effective manner, a conventional hydraulic expansion chuck in such a way that a shank tool having a shank fabricated with a larger diameter tolerance, e.g., h9, can be clamped with a level of quality that corresponds to a significantly tighter diameter tolerance, e.g., h6, and permits the transmission of higher torques. In addition, the hydraulic expansion chuck enables a central supply of coolant/lubricant to a clamped shank tool.

As already mentioned, the reducing bushing can positively connected with the chuck body either directly or indirectly via the expansion bushing of the hydraulic expansion mechanism rigidly accommodated in the chuck body. The indirect positive fit by way of the expansion bushing is to be preferred from a manufacturing standpoint, since the expansion bushing is easy to access for machining before it is integrated into the chuck body.

In a currently preferred further development of the hydraulic expansion chuck according to the invention, the positive connection between the reducing bushing and chuck body is provided on a longitudinal end section of the reducing bushing, in particular the axially interior one. In this further development, the outer circumferential positive fit can be realized without any problem, for example on a reduced-diameter inner longitudinal end section of the reducing bushing. To this end, the inner longitudinal end section can thus have a smaller outer diameter by comparison to the axially outer longitudinal end section and a central longitudinal section lying between the inner and outer longitudinal end section. The smaller diameter of the inner longitudinal end section shortens the length of the central longitudinal section of the reducing bushing that is to be machined to fit and used for transmitting the radial clamping force from the expansion bushing to a shank tool. The positive fit can be achieved by means of an outer polygonal profile, preferably an outer two-edge profile (also referred to as width across flats or outer dihedral), on the reduced-diameter longitudinal end section, which is positively accommodated in a corresponding inner polygonal profile, preferably an inner two-edge profile (also referred to as inner dihedral), of the chuck body. Because the positive fit between the reducing bushing and chuck body is shifted to a longitudinal end section, the axially central longitudinal section of the reducing bushing can continue to be used without limitation to transfer the force from the expansion bushing of the hydraulic expansion mechanism to the shank tool, thereby ensuring a uniform distribution of the clamping force via the reducing bushing to the shank tool.

Similarly to the positive fit between the reducing bushing and chuck body, the positive connection between the reducing bushing and shank tool is preferably provided on a longitudinal end section of the reducing bushing, in particular the axially interior one. To this end, the reducing bushing can exhibit an inner polygonal profile, preferably an inner four-edge profile, for the positive accommodation of an outer polygonal profile, preferably an outer four-edge profile, at the shank end of the shank tool.

The torsion of the reducing bushing can be minimized or prevented by axially restricting the position of the positive connection between the reducing bushing and chuck body, and of the positive connection between the reducing bushing and shank tool, to a shared longitudinal section of the reducing bushing, in particular the axially interior one.

The axially outer longitudinal section of the reducing bushing can further exhibit a supporting flange that axially abuts against a tool-side face of the chuck body. This makes it possible to axially restrict the axial position of the reducing bushing inside the expansion bushing of the hydraulic expansion mechanism, and hence the axial position of a clamped shank tool relative to the chuck body.

The attached drawings will be used below to describe an embodiment of a hydraulic expansion chuck according to the invention.

FIGS. 1 to 4 show an embodiment of a hydraulic expansion chuck 1 according to the invention. FIGS. 5a to 5e and 6 show a detailed view of a reducing bushing 24 arranged in the hydraulic expansion chuck 1 according to the invention.

Figure 1:
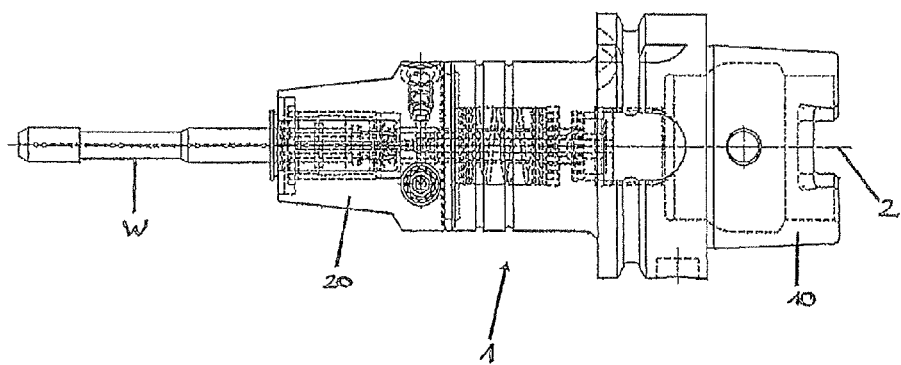
FIG. 1 shows a side view of an embodiment of a hydraulic expansion chuck according to the invention with a reducing bushing.
Figure 2:
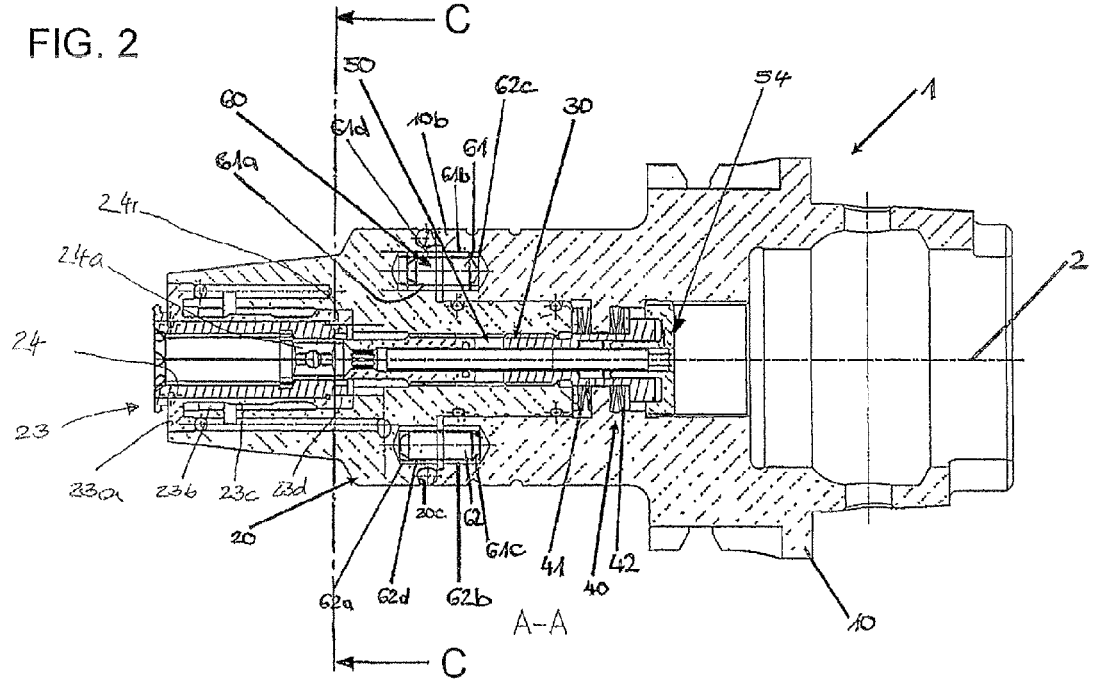
FIG. 2 shows an axial longitudinal section of the embodiment on a magnified scale.
Figure 3:
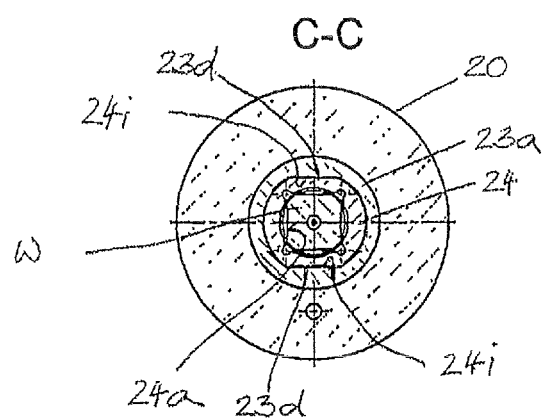
FIG. 3 shows a cross section of the embodiment to illustrate the twofold positive fit of the reducing bushing.
Figure 4:
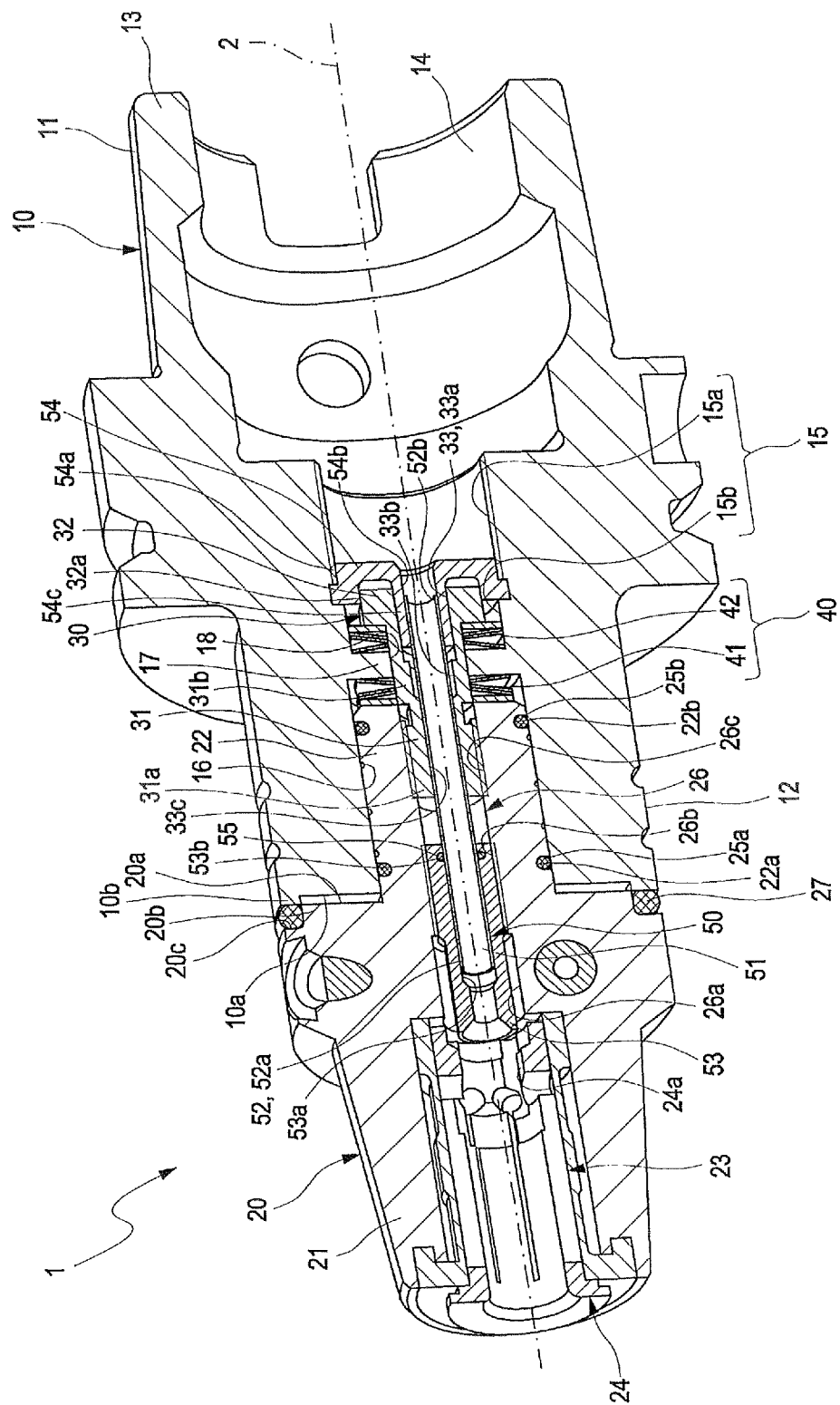
FIG. 4 shows an axial longitudinal section of the embodiment in a perspective view.
Figure 5B:
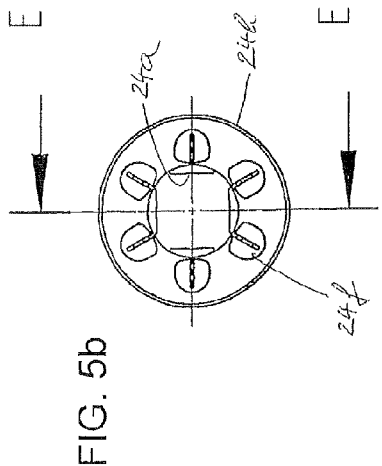
FIGS. 5a to 5e show the reducing bushing in various views.
Figure 5D:
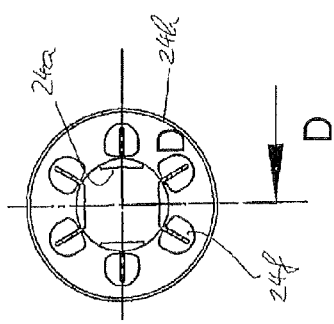
Figure 5A:
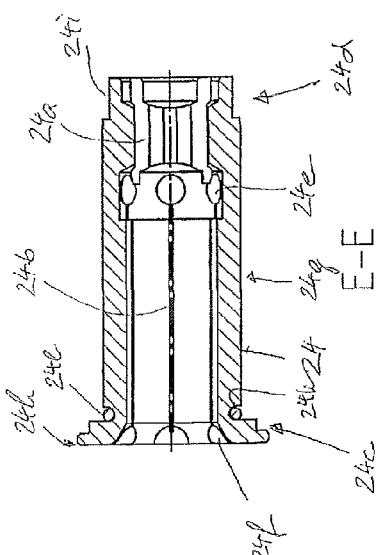
Figure 5C:
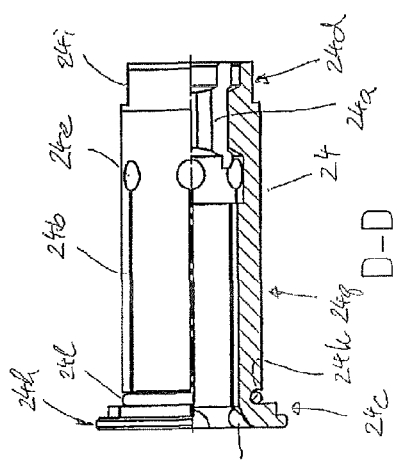
Figure 5E:
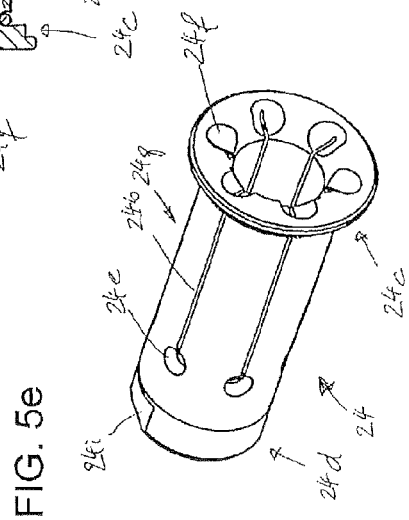

The hydraulic expansion chuck has an essentially two-part chuck body, which consists of a base body 10 and receptacle 20, and is shown in detail on FIG. 2 and FIG. 4. The base body 10 and receptacle 20 are joined together in a torsionally elastic manner for torque transmission by way of a torque entrainment device, and in an axially elastic manner for axial length compensation by way of a spring arrangement 40. The hydraulic expansion chuck 1 further exhibits a centrally arranged coolant transfer unit 50 that extends along the rotational axis 2.

The base body 10 is functionally divided into a shank section 11 and a bushing section 12, which extend along the rotational axis 2 of the hydraulic expansion chuck 1. The shank section 11 is used for coupling the hydraulic expansion chuck 1 to a shank tool machine spindle (not shown) or a shank tool module (also not shown) of a modularly designed shank tool system. To this end, the shank section 11 has a hollow shank taper 13 with an axial interior recess 14 and a central recess in the form of a stepped bore 15 that can be accessed via the interior recess 14 and is open on the machine tool side. In the direction of the receptacle 20 (from right to left on FIG. 2 and FIG. 4), the stepped bore 15 exhibits a threaded hole section 15a that empties into the interior recess 14 of the hollow shank taper 13, as well as a cylindrical hole section 15b with a smaller diameter that adjoins the threaded hole section 15a. The cylindrical hole section 15b incorporates one (42) of two spring elements 41, 42 of the spring arrangement 40. The bushing section 12 that axially lengthens the shank section 11 in the direction of the receptacle 20-exhibits a central guide borehole 16 that is open on the tool side. The guide borehole 16 is separated from the axial recess 15 of the shank section 11 by a radial dividing wall 17. The guide borehole 16 incorporates the other (41) of the two spring elements 41, 42 of the spring arrangement 40. An axial opening in the form of a central through borehole 18 is provided in the dividing wall 17. The guide borehole 16 of the bushing section 12, the through borehole 18 in the radial dividing wall 17, along with the central recess 15 and interior recess 14 of the shank section 11 all extend along the rotational axis 2 of the hydraulic expansion chuck 1.

The receptacle 20 is functionally divided into a receiving section 21 and a guide section 22, which extend along the rotational axis 2 of the hydraulic expansion chuck 1. The receiving section 21 is used to accommodate and clamp a tool W shown only on FIG. 1, and to this end exhibits a known hydraulic expansion mechanism 23.

In a manner known in the art, the hydraulic expansion mechanism 23 encompasses a sleeve-like expansion bushing 23a that is permanently soldered into the receptacle 20 or immovably arranged therein in some other way, and has a continuously smooth cylindrical inner wall, which tightly seals a hydraulic expansion chamber 23b formed in the receptacle 20. As a result, the expansion bushing 23a forms a one-piece constituent of the receptacle 20 or chuck body. When the hydraulic expansion chamber is pressurized, the expansion bushing 23a expands from the inside out due to a flexible bushing wall 23c in its axially central longitudinal section, which positively clamps a reducing bushing 24 precisely fitted in the expansion bushing. For this purpose, the axially central longitudinal section 24g of the reducing bushing 24 (see FIG. 5a, 5c) has a plurality of longitudinal slots 24b equidistantly distributed around the circumference of the rotational axis 2 of the hydraulic expansion chuck 1, which enables a circumferentially uniform distribution and transmission of the expansion force exerted by the expansion bushing 23a of the hydraulic expansion mechanism 23 to a shank tool shank W accommodated in the expansion bushing 23a (see FIG. 1).

In contrast, the front or outer longitudinal end section 24c in the tool feed direction (from right to left on FIG. 1, 2, 4) as well as the rear and/or inner longitudinal end section 24d of the reducing bushing 24 in the tool feed direction are continuous in the circumferential direction, i.e., have no slots. As evident on FIGS. 5a to 5e, the inner ends of the longitudinal slots 24b each terminate in a radial borehole 24e, which is formed through the sleeve wall of the reducing bushing 24, while the outer ends each terminate in a concave depression or recess 24f axially worked into the reducing bushing 24 from the front face. Aside from the longitudinal slots 24b and radial boreholes 24e, the axially central longitudinal section 24g of the reducing bushing 24 is continuously cylindrical, i.e. it in particular exhibits no lateral flattened areas, entrainer surfaces, etc. By comparison to the central longitudinal section 24g, the diameter of the frontal or outer longitudinal end section 24c is enlarged by a radial supporting flange 24h, while the diameter of the rear or inner longitudinal end section 24d is slightly diminished.

The reducing bridge 24 bridges the difference in diameter between the inner diameter of the expansion bushing 23a and the outer diameter of the shank of a shank tool W to be clamped (see FIG. 1), and provides for a positive torque entrainment of the shank tool in the hydraulic expansion chuck 1. According to the invention, the outer circumference of the reducing bushing 24 is for this purpose positively connected in a torque-proof manner with the chuck body, in particular the receptacle 20 of the chuck body. In the embodiment, the positive connection between the reducing bushing 24 and the receptacle 20 is provided at the axially rear or inner reduced-diameter longitudinal end section 24d of the reducing bushing 24. The outer circumferential positive fit can be realized on the reduced-diameter inner longitudinal end section 24d of the reducing bushing 24 without any problem. To this end, the reducing bushing 24 in particular has an outer polygonal profile in the form of an outer two-edge [profile] 24i, which is positively accommodated in a corresponding inner polygonal profile in the form of an inner two-edge [profile] 23d in the expansion bushing 23a rigidly incorporated in the receptacle 20 (see FIG. 3, FIG. 5e).

According to the invention, a shank tool W to be clamped is further clamped in the hydraulic expansion mechanism 23 by means of the reducing bushing 24 with a positive torque entrainment between its shank and the reducing bushing 24. To this end, the inner circumference of the reducing bushing 24 has an inner four-edge contour 24a for the positive accommodation of an outer four-edge section visible on FIG. 3 at the shank end of the shank of the shank tool W. In the embodiment, the positive connection between the reducing bushing 24 and the shank tool W is provided on the inner or rear longitudinal end section 24d of the reducing bushing 24.

The twofold positive fit of the reducing bushing—with the receptacle 20 of the chuck body of the hydraulic expansion chuck 1 on the one hand and with the shank of a shank tool W to be clamped in the hydraulic expansion chuck 1 on the other—already yields a reliably torque-proof arrangement of the shank tool W in the hydraulic expansion chuck 1 that basically does not depend on the size of the tolerance field—e.g., whether it be h9 or h6—for the shank diameter of the shank tool W. As a consequence, torque transmission from the chuck body (base body 10 and receptacle 20) to the shank tool W is first and foremost achieved by the twofold positive fit between the reducing bushing 24 and chuck body (base body 10 and receptacle 20), and between the reducing bushing 24 and shank tool W. Therefore, the non-positive fit achieved by the hydraulic expansion mechanism 1 between the reducing bushing 24 and expansion bushing 23a must essentially still only ensure the transfer of axial tensile/compressive forces from the chuck body to the shank tool W.

By comparison to conventional hydraulic expansion chucks, the solution according to the invention hence enables the transmission of higher torques for a larger tolerance field, e.g., h9, with respect to the shank diameter of a shank tool W to be clamped, which had previously basically only been possible with significantly tighter tolerances, e.g., h6. In addition, the solution according to the invention makes it possible to clamp various shank diameters into one and the same hydraulic expansion chuck 1 due to the reducing bushing. Therefore, the invention makes it possible to modify, in a structurally easily manageable, and hence cost effective manner, a conventional hydraulic expansion chuck in such a way that a shank tool W having a shank fabricated with a larger diameter tolerance, e.g., h9, can be clamped with a level of quality that corresponds to a significantly tighter diameter tolerance, e.g., h6, and permits the transmission of higher torques.

The torsion of the reducing bushing 24 can be minimized by axially restricting the position of the positive connection between the reducing bushing 24 and chuck body, and of the positive connection between the reducing bushing 24 and shank tool W, to a shared longitudinal section of the reducing bushing 24, in particular the inner or rear longitudinal end section 24d of the reducing bushing 24.

Figure 6:
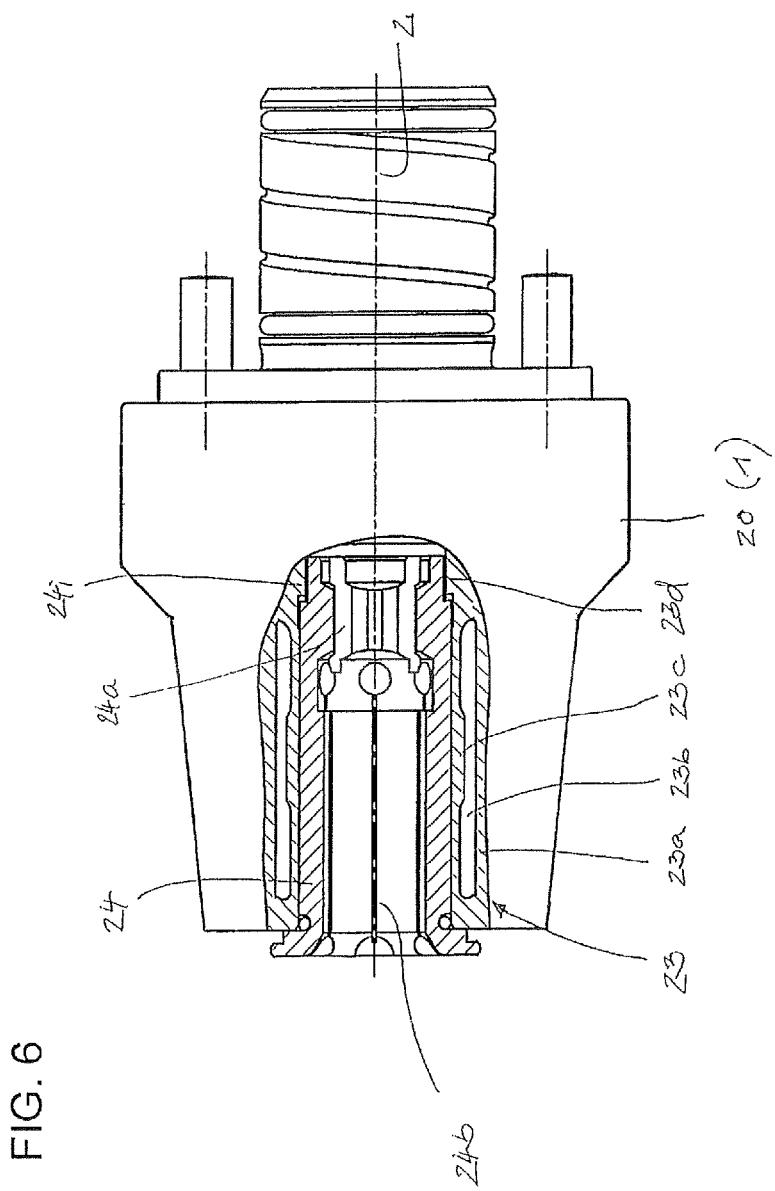
FIG. 6 shows a schematic view of the arrangement of the reducing bushing in a receptacle of the chuck body of the hydraulic expansion chuck.

The front or outer longitudinal end section 24c of the reducing bushing 24 has the aforementioned radially projecting supporting flange 24h, which axially abuts against a tool-side face of the receptacle 20, as may be gleaned in particular from FIG. 6, for example. The supporting flange 24h establishes the position of the reducing bushing 24 within the expansion bushing 23a of the hydraulic expansion mechanism 23, thereby also restricting the axial position of a clamped shank tool W relative to the chuck body. The outer circumference of the reducing bushing 24 exhibits an annular groove 24k, which is situated axially within the supporting flange 24h between the outer or front longitudinal end section 24c and the central longitudinal section 24g, and is incorporated in an O-ring gasket 241 that seals the joint play between the reducing bushing 24 and expansion bushing 23a.

The cylindrical guide section 22 that lengthens the receiving section 21 in the direction of the base body 10 is accommodated in the guide borehole 16 of the base body in an axially movable manner with a defined lateral play. The annular gap between the outer circumference of the guide section 22 of the receptacle 20 and the inner circumference of the guide borehole 16 of the base body 10 is sealed by means of two O-ring gaskets 25a, 25b, which are each accommodated in an outer circumferential annular groove 22a, 22b of the guide section 22. The guide section 22 has running through it a central stepped bore 26, which in the direction of the base body 10 (from left to right on FIG. 2 and FIG. 4) exhibits a cylindrical hole section 26a, a threaded hole section 26b with a smaller diameter, and a threaded hole section 26c with a larger diameter.

The receptacle 20 is anchored in the base body 10 via the anchor 30. The anchor 30 is functionally divided into an anchor shank 31 that extends through the through borehole 18 in the radial dividing wall 17 of the base body 10 and an anchor head 32 situated on the anchor shank 31. In the embodiment, the anchor 30 is designed like a cap screw. The anchor shank 31 is screwed into the larger-diameter threaded hole section 26c of the guide section 22 of the receptacle 20 by way of a male thread provided on its tool-side end section 31a, and accommodated with a defined lateral play in the through borehole 18 of the radial dividing wall 17 in an axially and rotationally movable manner by means of a cylindrical middle section 31b. As a result, the anchor 30 provides the receptacle 20 with an additional axial guide in the base body 10. The anchor head 32 has a cylindrical outer circumference 32a, and forms a stop for the spring element 42. The anchor shank 31 and anchor head 32 are designed as a single piece in the embodiment. Therefore, the anchor 30 is bolted to the receptacle 20 so that it can be displaced axially relative thereto. An axial through borehole in the form of a stepped bore 33 runs through the anchor 30. The stepped bore 33 exhibits a hole section 33a with a larger diameter, a hexagon socket section 33b and a hole section 33c with a smaller diameter in the direction of the receptacle 20 (viewed from right to left on FIG. 2 and FIG. 4). A matching shank tool wrench can be introduced into the hexagon socket section 33b on FIG. 2 and FIG. 4 from the right via the interior recess 14 in the hollow shank taper 13, the recess 15 in the shank section 11 of the base body 10, and the larger-diameter hole section 33a of the stepped bore 33 in the anchor 30, so as to axially adjust the anchor 30 via bolting in the base body 10.

As already mentioned, the spring arrangement 40 that generates the spring preload between the base body 10 and receptacle 20 is realized by the two spring elements 41, 42, wherein the spring element 41 is situated between the machine tool-side face of the guide section 22 of the receptacle 20 and the tool-side face of the radial dividing wall 17 of the base body 10, and the spring element 42 is located between the machine tool-side face of the radial dividing wall 17 and the tool-side face of the anchor head 32 of the anchor 30. The two spring elements 41, 42 are each designed as a spring packet comprised of several plate springs made out of metal and/or polymer material, and have the same spring characteristics. In particular, FIG. 2 and FIG. 4 show that the spring packets are each composed of three plate springs, which are connected in series as a whole, but with two of the three plate springs being connected in parallel. The anchor shank 31 extends centrally through the two spring elements 41, 42. The two spring elements 41, 42 provide for a small axial distance between the base body 10 and receptacle 20 that is required for axial length compensation, and enable length compensation in both the compressive and tensile directions along the rotational axis 2 of the hydraulic expansion chuck 1. Bolting the anchor 30 relative to the receptacle 20 brings about a synchronous change in the spring preload or spring travel of the two spring elements 41, 42. As mentioned above, the anchor 30 is actuated by means of a suitable shank tool wrench via the interior recess 14 of the hollow shank taper 13 and the central recess 15 of the shank section 11 adjacent thereto in order to set the spring preload of the spring arrangement 40.

The axially opposing faces 10a, 20a of the base body 10 and receptacle 20 are positively and non-positively joined together in the rotational direction for transmitting the torque between the base body 10 and receptacle 20. The positive and non-positive connection between the opposing faces 10a, 20b of the base body 10 and receptacle 20 is realized by two diametrically arranged cylindrical entrainer pins 61, 62, which axially project from the face 10a of the base body and engage into opposing engagement boreholes 61a, 62a (engagement openings) on the receptacle 20 in an axially movable manner. The two entrainer pins 61, 62 are each arranged over a fitting sleeve 61c, 62c that is made out of an elastic polymer material and rests in an axial receiving borehole 61b, 61c (receiving opening) on the base body 10, and each engage in an axially movable manner into a fitting sleeve 61d, 62d that is made out of an elastic polymer material and inserted into the allocated engagement borehole 61a, 62a on the receptacle 20. Therefore, the base body 10 and receptacle 20 are not rigidly connected with each other in a rotational or torsional direction, but rather joined together in a torsion-attenuated and rotationally elastic manner due to the elastic fitting sleeves 61c, 62c, 61d, 62d. As shown on FIG. 2 and FIG. 4, the positive and non-positive connection between the base body 10 and receptacle 20 realized by the entrainer pins 61, 62 is established radially outside of the guide section 22 of the receptacle 20 when viewed axially, making it possible to transmit a high torque.

As further evident from FIG. 2 and FIG. 4, the face 10a of the bushing section 12 of the base body 10 has an annular projection 10b that runs around the outer circumference and envelops a cylindrical projection 20b of the face 20a of the receptacle 20 with a defined lateral play. An O-ring gasket 27 rests on the outer circumference of the cylindrical projection 20b of the receptacle 20a. As a consequence, the O-ring gasket 27 is situated between the annular surface 20c that envelops the cylindrical projection 20b of the receptacle 20 and faces the base body 10 and the face of the annular projection 10b of the bushing section 12 of the base body 10 that faces the receptacle 20. The O-ring gasket 27 produces a seal for the axial gap between the base body 10 and receptacle 20, which is necessary for length compensation and ensured by the spring preload, and provides for an axial attenuation between the receptacle 20 and base body 10. In addition to the axial guidance by the guide section 22 of the receptacle 20 accommodated in the guide borehole 16 of the bushing section 12, the axial engagement by the cylindrical projection 20b of the receptacle 20 into the annular projection 10b of the bushing section 12 of the base body 10 yields a further, if only slight, axial guidance of the receptacle 20 relative to the base body 10.

The hydraulic expansion chuck 1 shown on FIG. 1 to FIG. 4 also has an MQL (minimum quantity lubrication) lubricating coolant transfer unit 50, which runs along the rotational axis 2 centrally through the tool mount 1, and defines a central lubricating coolant channel 51 for feeding a lubricating coolant supplied on the machine tool side to a shank tool W accommodated in the receptacle 20. The lubricating coolant transfer unit 50 exhibits a lubricating coolant transfer tube 52 that penetrates through the stepped bore 33 of the anchor 30, an axial adjusting screw 53 screwed into the smaller-diameter threaded hole section 26b of the guide section 22 accessible on the tool side, as well as a locking element 54 (threaded coupling) screwed into the threaded hole section 15a of the recess 15 of the base body 10 accessible from the machine tool side. The tool-side end section 52a of the lubricating coolant transfer tube 52 is accommodated in an axially movable manner in an axial through borehole 53a of the axial adjusting screw 53 with a defined lateral play. The lateral play between the outer circumference of the lubricating coolant transfer tube 52 and the inner circumference of the axial adjusting screw 53 is sealed by an O-ring gasket 55, which is arranged in an annular groove 53b of the axial adjusting screw 53 located on the inner circumference side. The lubricating coolant transfer tube 53 further extends through the stepped borehole 33 penetrating through the anchor 30, and its machine tool-side end section 52b is pressed fluid-tight into through borehole 54b of the locking element 54 overlapping the anchor 30 on the machine tool side, i.e., connected with the locking element 54 in a torque-proof and axially rigid manner. The outer circumference of the locking element 54 exhibits a male thread 54a, which is screwed into the threaded hole section 15a of the stepped bore 15 of the shank section 11 of the base body 10. The locking element 54 prevents dirt particles from penetrating in the direction of the two spring elements 41, 42 of the spring arrangement 40 via the lateral gap between the anchor 30 and base body 10. In addition, the locking element 54, whose axial position in the base body 10 does not depend on the location of the anchor 30 or axial adjusting screw 53, forms an interface for connecting the lubricating coolant transfer unit 50 to a lubricating coolant feed site provided on the machine tool side (not shown).

As shown by FIG. 2, 4, the locking element 54 exhibits a tube projection 54c on the tool side that engages into the enlarged-diameter bore section 33a of the stepped bore 33 of the anchor 30, thereby additionally centering and securing the anchor 30. Twisting the locking element 54 causes the lubricating coolant transfer tube 52 to be axially adjusted relative to the axial adjusting screw 53 or to the anchor 30.

The hydraulic expansion chuck according to the invention is not limited to the embodiment shown on FIGS. 1 to 4, but can be modified within the scope defined by the claims.

Instead of indirectly, the reducing bushing 24 can be positively connected directly with the chuck body or receptacle 20 by way of the expansion bushing 23a of the hydraulic expansion mechanism 23 that is permanently soldered into the chuck body, in particular the receptacle 20 of the chuck body, or in some other way fixedly integrated therein. The direct positive connection between the reducing bushing 24 and chuck body can be realized axially within, i.e., in back of the expansion bushing 23a of the hydraulic expansion mechanism 23 as viewed in the feed direction of the hydraulic expansion chuck 1, or axially outside, i.e., in front of the expansion bushing 23a of the hydraulic expansion mechanism 23, as viewed in the feed direction of the hydraulic expansion chuck 1. For example, the reducing bushing 24a can be fixed in a rotational direction by a positive fit between the radial supporting flange 24h and the opposing face of the expansion bushing 23a or opposing face of the receptacle 20. For example, such a positive fit can be achieved with one or more axial extensions, noses, projections or the like on the chuck body-side annular surface of the supporting flange 24h, which axially engage(s) in corresponding entrainer grooves, recesses, or the like when the reducing bushing 24 is axially introduced into the expansion bushing 23a.

REFERENCE LIST

1 Hydraulic expansion chuck
2 Rotational axis
10 Chuck body
10a Face
10b Annular projection
11 Shank section
12 Bushing section
13 Hollow shank taper
14 Interior recess
15 Stepped bore
15a Threaded hole section
15b Hole section
16 Guide borehole
17 Dividing wall
15 Recess
18 Through borehole
20 Chuck
20a Face
20b Cylindrical projection
20c Annular stage
21 Receiving section
22 Guide section
23 Hydraulic expansion mechanism
23a Expansion bushing
23b Expansion chamber
23c Bushing wall
23d Inner two-edge profile
24 Reducing bushing
24a Inner four-edge profile
24b Longitudinal slot
24c Outer or front longitudinal end section
24d Inner or rear longitudinal end section
24e Radial borehole
24f Concave recess or depression
24g Central longitudinal section
24h Supporting flange
24i Outer two-edge profile
24k Annular groove
24l O-ring gasket
25a O-ring gasket
25b O-ring gasket
22a Annular groove
22b Annular groove
26 Stepped bore
26a Hole section
26b Threaded hole section
26c Threaded hole section
27 O-ring gasket
30 Anchor
31 Anchor shank
32 Anchor head
31a End section
31b Middle section
32a Hexagon head contour 33 Stepped bore (through borehole)
33a Threaded hole section
33b Hole section
33c Hole section
40 Spring arrangement
41 Spring element
42 Spring element
50 Lubricating coolant transfer unit
51 Lubricating coolant channel
52 Lubricating coolant transfer tube
52a End section
52b End section
53 Adjusting screw
53a Through borehole
53b Annular groove
54 Locking element
54a Male thread
54b Through borehole
54c Tube projection
55 O-ring gasket
60 Torque entrainment device
61 Entrainer pin
62 Entrainer pin
61a Engagement borehole (engagement openings)
62a Engagement borehole (engagement openings)
61b Receiving borehole (receiving opening)
62b Receiving borehole (receiving opening)
61c Fitting sleeve
62c Fitting sleeve
61d Fitting sleeve
62d Fitting sleeve

The invention claimed is:

1. A hydraulic expansion chuck comprising: a chuck body; a hydraulic expansion mechanism; and a reducing bushing, the hydraulic expansion mechanism integrated into the chuck body, the hydraulic expansion mechanism comprising an expansion bushing, a first region of an inner surface of the expansion bushing substantially cylindrical relative to a first axis, the first region of the inner surface of the expansion bushing located between a first plane and a second plane, the first plane and the second plane each perpendicular to the first axis, a second region of the inner surface of the expansion bushing located between a third plane and a fourth plane, the third plane and the fourth plane each perpendicular to the first axis, at least a first portion of the second region of the inner surface of the expansion bushing being non-cylindrical, at least part of the reducing bushing in a space defined by the inner surface of the expansion bushing, a first part of an outer surface of the reducing bushing located between the third plane and the fourth plane, at least a first portion of the first part of the outer surface of the reducing bushing being non-cylindrical, said first portion of the second region of the inner surface of the expansion bushing being aligned with said first portion of the first part of the outer surface of the reducing bushing, whereby contact between said first portion of the second region of the inner surface of the expansion bushing and said first portion of the first part of the outer surface of the reducing bushing prevents rotation of the reducing bushing about said first axis relative to the expansion bushing, at least a first portion of an inner surface of the reducing bushing being non-cylindrical, said first portion of said inner surface of the reducing bushing thereby being configured to contact a non-cylindrical portion of an outer surface of a shank tool to prevent rotation of the shank tool about said first axis relative to the reducing bushing.

2. The hydraulic expansion chuck according to claim 1, wherein the first part of the outer surface of the reducing bushing extends to a longitudinal end section of the reducing bushing.

3. The hydraulic expansion chuck according to claim 1, wherein the reducing bushing comprises a first end section, a second end section, and a central section between the first end section and the second end section, the first end section having a smaller outer periphery than an outer periphery of the second end section and an outer periphery of the central section.

4. The hydraulic expansion chuck according to claim 1, wherein the first part of the outer surface of the reducing bushing has an outer polygonal profile, which is accommodated in an inner polygonal profile of the second region of the inner surface of the expansion bushing.

5. The hydraulic expansion chuck according to claim 4, wherein the outer polygonal profile is an outer two-edge profile, and the inner polygonal profile is an inner two-edge profile.

6. The hydraulic expansion chuck according to claim 1, wherein the first part of the inner surface of the reducing bushing extends to an end section of the reducing bushing.

7. The hydraulic expansion chuck according to claim 6, wherein the reducing bushing comprises an outer end section and an inner end section, the outer end section of the reducing bushing adjacent to an opening in the chuck body, and the first part of the inner surface of the reducing bushing extends to the inner end section of the reducing bushing.

8. The hydraulic expansion chuck according to claim 1, wherein the first portion of the inner surface of the reducing bushing exhibits an inner polygonal profile for contacting an outer polygonal profile at a shank end of the shank tool.

9. The hydraulic expansion chuck according to claim 8, wherein the inner polygonal profile of the reducing bushing is an inner four-edge profile, and wherein the outer polygonal profile of the shank tool is an outer four-edge profile.

10. The hydraulic expansion chuck according to claim 1, wherein an end section of the reducing bushing further comprises a supporting flange that axially abuts against a tool-side face of the chuck body.

11. The hydraulic expansion chuck according to claim 1, wherein the chuck body comprises a base body and a receptacle, the receptacle joined with the base body at least in an axially elastic manner, wherein the hydraulic expansion mechanism is integrated into the receptacle.

12. The hydraulic expansion chuck according to claim 11, wherein the base body and the receptacle are joined in a torsionally elastic manner.

13. The hydraulic expansion chuck according to claim 1, wherein the shank tool is a tap drill.

14. The hydraulic expansion chuck according to claim 1, wherein the reducing bushing comprises an outer end section and an inner end section, the outer end section of the reducing bushing adjacent to an opening in the chuck body, and the first part of the outer surface of the reducing bushing extends to the inner end section of the reducing bushing.

* * * * *